(12) United States Patent
Loehr et al.

(10) Patent No.: US 12,446,113 B2
(45) Date of Patent: *Oct. 14, 2025

(54) MEDIUM ACCESS CONTROL PROTOCOL DATA UNIT IN A MESSAGE 3 BUFFER

(71) Applicant: Lenovo (Singapore) Pte. Ltd., New Tech Park (SG)

(72) Inventors: Joachim Loehr, Wiesbaden (DE); Prateek Basu Mallick, Dreieich (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 27 days.

This patent is subject to a terminal disclaimer.

(21) Appl. No.: 18/311,706

(22) Filed: May 3, 2023

(65) Prior Publication Data

US 2023/0276533 A1    Aug. 31, 2023

Related U.S. Application Data

(63) Continuation of application No. 17/375,956, filed on Jul. 14, 2021, now Pat. No. 11,683,857, which is a
(Continued)

(51) Int. Cl.
*H04W 80/02* (2009.01)
*H04L 1/1867* (2023.01)
(Continued)

(52) U.S. Cl.
CPC ........... *H04W 80/02* (2013.01); *H04L 1/1874* (2013.01); *H04W 72/23* (2023.01); *H04W 74/02* (2013.01); *H04W 74/0833* (2013.01)

(58) Field of Classification Search
CPC . H04W 80/02; H04W 72/14; H04W 72/1268; H04W 74/02; H04W 74/0833;
(Continued)

(56) References Cited

U.S. PATENT DOCUMENTS

2011/0261763 A1    10/2011   Chun et al.
2012/0127930 A1    5/2012   Nguyen et al.
(Continued)

OTHER PUBLICATIONS

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.
(Continued)

*Primary Examiner* — Candal Elpenord
(74) *Attorney, Agent, or Firm* — Kunzler Bean & Adamson

(57) ABSTRACT

Apparatuses, methods, and systems are disclosed for using a medium access control protocol data unit in a message 3 buffer. One method includes, in response to a medium access control protocol data unit being in a message 3 buffer and receiving an uplink grant: obtaining the medium access control protocol data unit from the message 3 buffer; if a first size of the uplink grant does not match a second size of the medium access control protocol data unit: indicating to a multiplexing and assembly entity to include medium access control sub-protocol data units carrying medium access control service data units from the obtained medium access control protocol data unit in a subsequent uplink transmission; and obtaining the medium access control protocol data unit from the multiplexing and assembly entity.

20 Claims, 5 Drawing Sheets

Related U.S. Application Data continuation of application No. 16/565,813, filed on Sep. 10, 2019, now Pat. No. 11,129,232.

(60) Provisional application No. 62/729,339, filed on Sep. 10, 2018.

(51) Int. Cl.
  *H04W 72/23* (2023.01)
  *H04W 74/02* (2009.01)
  *H04W 74/08* (2024.01)
  *H04W 74/0833* (2024.01)

(58) Field of Classification Search
  CPC .. H04W 28/065; H04L 1/1874; H04L 1/1822; H04L 1/1835
  USPC .................................................. 370/329–330
  See application file for complete search history.

(56) References Cited

U.S. PATENT DOCUMENTS

| | | |
|---|---|---|
| 2013/0279451 A1 | 10/2013 | Park et al. |
| 2015/0223232 A1* | 8/2015 | Eriksson ........... H04W 72/0446 370/329 |
| 2015/0282213 A1 | 10/2015 | Sun et al. |
| 2017/0311344 A1 | 10/2017 | Lee et al. |
| 2018/0359657 A1 | 12/2018 | Kim |
| 2019/0245657 A1 | 8/2019 | Lee et al. |
| 2020/0137776 A1 | 4/2020 | Lee et al. |
| 2020/0244406 A1 | 7/2020 | Lee et al. |
| 2021/0014899 A1 | 1/2021 | Shih et al. |
| 2021/0266980 A1* | 8/2021 | Kim .................. H04W 74/0833 |

OTHER PUBLICATIONS

3GPP, "3rd Generation Partnership Project; Technical Specification Group Radio Access Network; NR; Physical layer procedures for control (Release 15)", 3GPP TS 38.213 V15.2.0, Jun. 2018, pp. 1-99.

3GPP, "3rd Generation Partnership Project; Technical Specification Group Radio Access Network; NR; Physical layer procedures for data (Release 15)", 3GPP TS 38.214 V15.2.0, Jun. 2018, pp. 1-95.

VIVO: "Discussion on the switch between CFRA and CBRA", 3GPP TSG-RAN WG2 Meeting #103, 3GPP Draft; R2-1811898, Aug. 2018.

Samsung Electronics, "Title: Msg3 handling for swtiching between CBRA to CFRA", 3GPP TSG-RAN2 103, R2-1811107, Aug. 2018.

Nokia, Nokia Shanghai Bell, "Msg3 handling when switching from CBRA to CFRA", 3GPP TSG-RAN WG2 Meeting NR Adhoc 1807, R2-1810157, Jul. 2018.

* cited by examiner

MEDIUM ACCESS CONTROL PROTOCOL DATA UNIT IN A MESSAGE 3 BUFFER

CROSS-REFERENCE TO RELATED APPLICATIONS

This application claims priority to U.S. patent application Ser. No. 17/375,956, filed on Jul. 14, 2021, which claims priority to U.S. patent application Ser. No. 16/565,813, filed on Sep. 10, 2019, which claims priority to U.S. Patent Application Ser. No. 62/729,339 entitled "HARQ BUFFER MANAGEMENT FOR RACH PROCEDURE IN NR" and filed on Sep. 10, 2018 for Joachim Loehr, all of which are incorporated herein by reference in their entirety.

FIELD

The subject matter disclosed herein relates generally to wireless communications and more particularly relates to a medium access control protocol data unit in a message 3 buffer.

BACKGROUND

The following abbreviations are herewith defined, at least some of which are referred to within the following description: Third Generation Partnership Project ("3GPP"), 5th Generation ("5G"), Positive-Acknowledgment ("ACK"), Aggregation Level ("AL"), Access and Mobility Management Function ("AMF"), Access Point ("AP"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function (""PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RIM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management Function ("SMF"), Special Cell ("SpCell"), Single Network Slice Selection Assistance Information ("S-NSSAI"), Signaling Radio Bearer ("SRB"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TB S"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), and Worldwide Interoperability for Microwave Access ("WiMAX").

In certain wireless communications networks, a RACH procedure may be used. In such networks, buffers may be used as part of the RACH procedure.

BRIEF SUMMARY

Methods for using a medium access control protocol data unit in a message 3 buffer are disclosed. Apparatuses and systems also perform the functions of the apparatus. One embodiment of a method includes, in response to a medium access control protocol data unit being in a message 3 buffer and receiving an uplink grant: obtaining the medium access control protocol data unit from the message 3 buffer; if a first size of the uplink grant does not match a second size of the medium access control protocol data unit: indicating to a multiplexing and assembly entity to include medium access control sub-protocol data units carrying medium access control service data units from the obtained medium access control protocol data unit in a subsequent uplink transmission; and obtaining the medium access control protocol data unit from the multiplexing and assembly entity.

One apparatus for using a medium access control protocol data unit in a message 3 buffer includes a receiver and a processor that: in response to a medium access control protocol data unit being in a message 3 buffer and the receiver receiving an uplink grant: obtains the medium access control protocol data unit from the message 3 buffer; if a first size of the uplink grant does not match a second size of the medium access control protocol data unit: indicates to a multiplexing and assembly entity to include medium access control sub-protocol data units carrying medium access control service data units from the obtained medium access control protocol data unit in a subsequent uplink transmission; and obtains the medium access control protocol data unit from the multiplexing and assembly entity.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
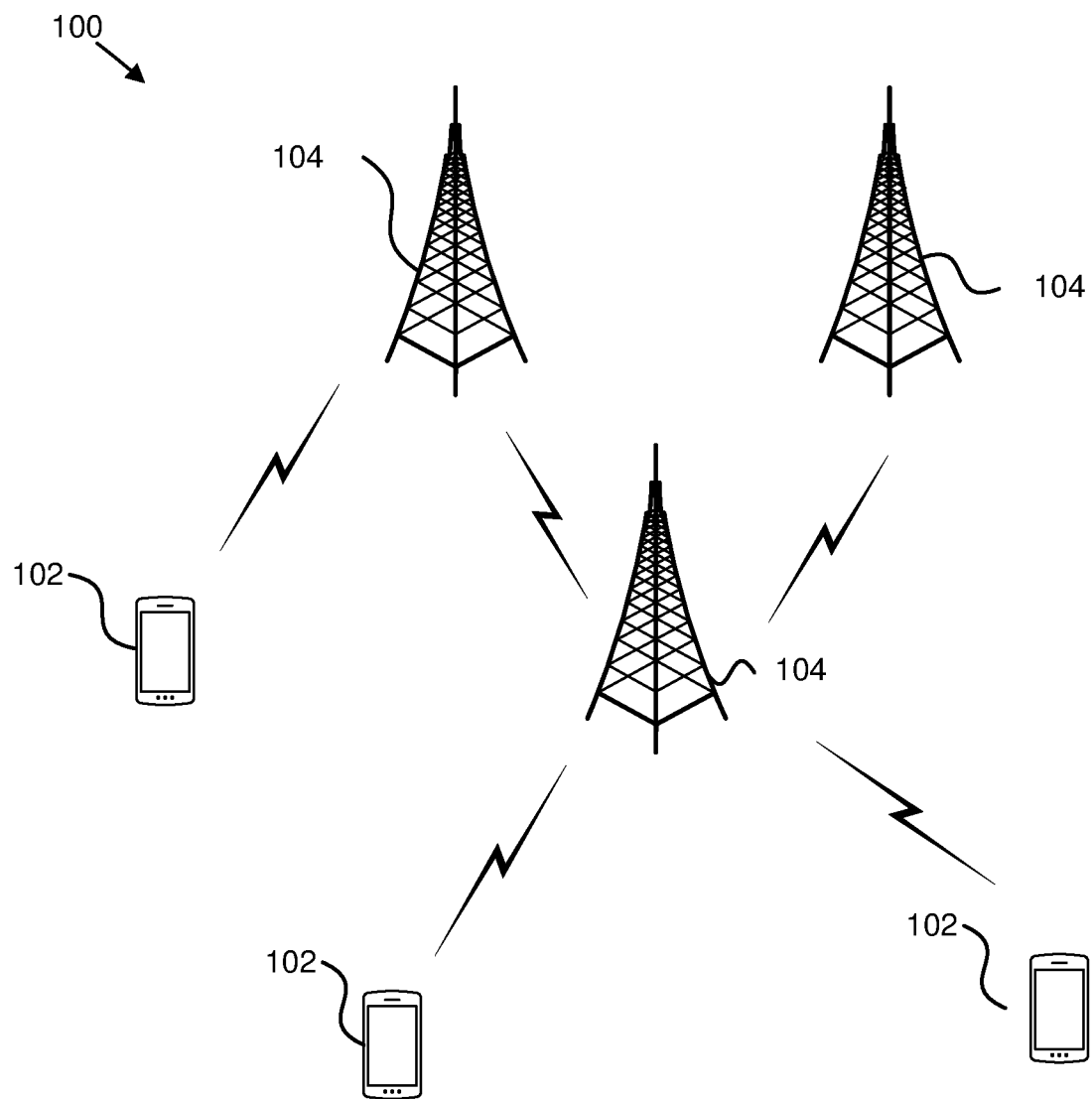
FIG. 1 is a schematic block diagram illustrating one embodiment of a wireless communication system for using a medium access control protocol data unit in a message 3 buffer.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for using a medium access control protocol data unit in a message 3 buffer. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may, in response to a medium access control protocol data unit being in a message 3 buffer and receiving an uplink grant: obtain the medium access control protocol data unit from the message 3 buffer; if a first size of the uplink grant does not match a second size of the medium access control protocol data unit: indicate to a multiplexing and assembly entity to include medium access control sub-protocol data units carrying medium access control service data units from the obtained medium access control protocol data unit in a subsequent uplink transmission; and obtain the medium access control protocol data unit from the multiplexing and assembly entity. Accordingly, the remote unit 102 may be used for using a medium access control protocol data unit in a message 3 buffer.

Figure 2:
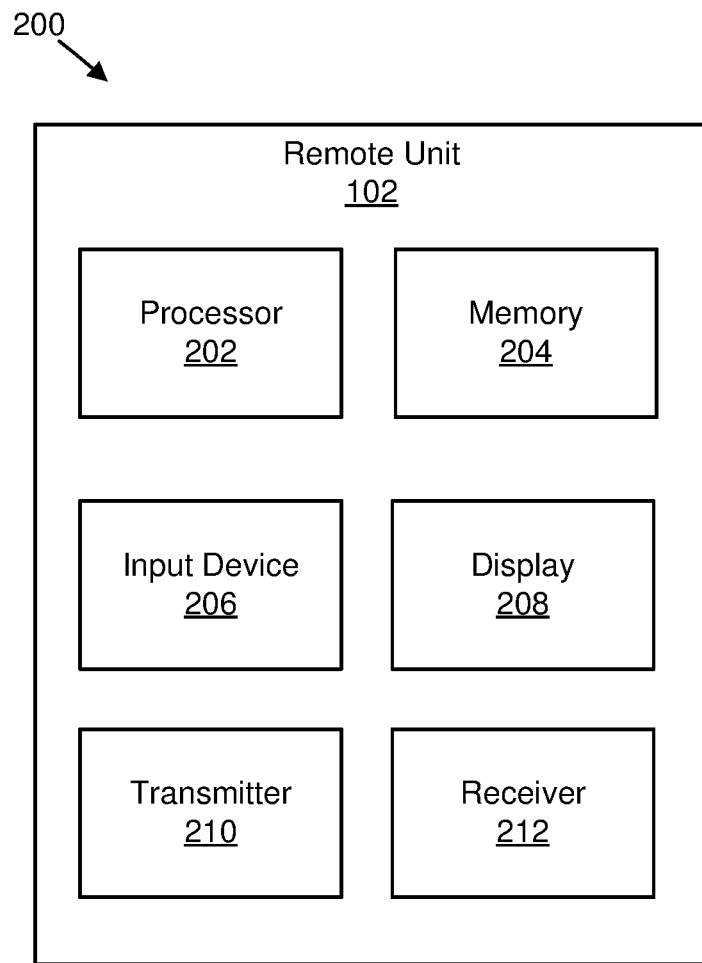
FIG. 2 is a schematic block diagram illustrating one embodiment of an apparatus that may be used for using a medium access control protocol data unit in a message 3 buffer.

FIG. 2 depicts one embodiment of an apparatus 200 that may be used for using a medium access control protocol data unit in a message 3 buffer. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: in response to a medium access control protocol data unit being in a message 3 buffer and a receiver receiving an uplink grant: obtain the medium access control protocol data unit from the message 3 buffer; if a first size of the uplink grant does not match a second size of the medium access control protocol data unit: indicate to a multiplexing and assembly entity to include medium access control sub-protocol data units carrying medium access control service data units from the obtained medium access control protocol data unit in a subsequent uplink transmission; and obtain the medium access control protocol data unit from the multiplexing and assembly entity. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
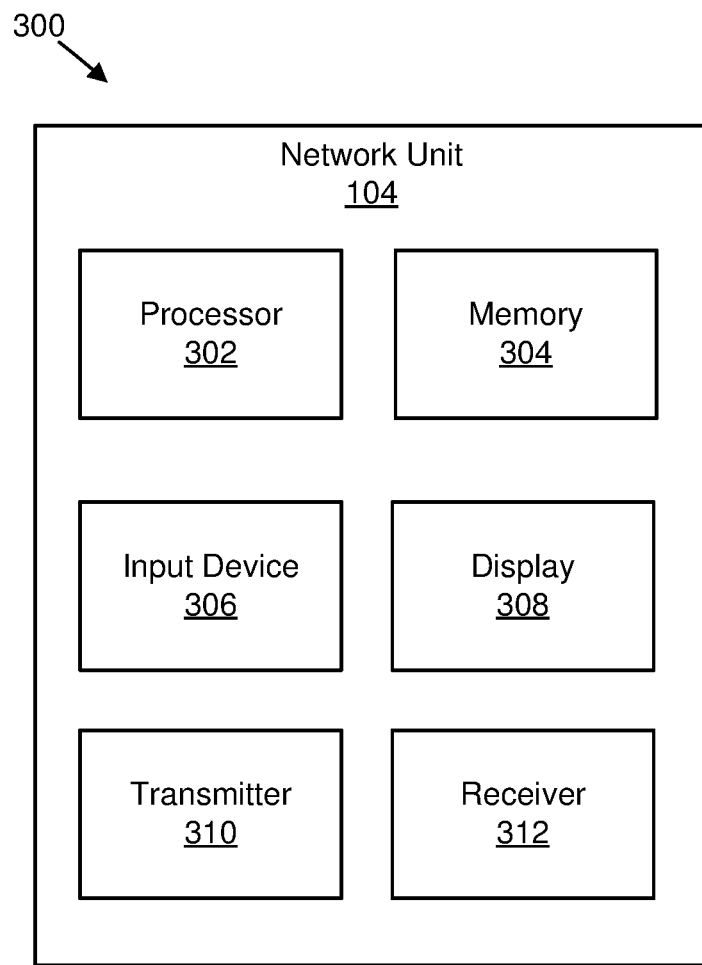
FIG. 3 is a schematic block diagram illustrating one embodiment of an apparatus that may be used for transmitting and/or receiving information and/or data.

FIG. 3 depicts one embodiment of an apparatus 300 that may be used for transmitting and/or receiving information and/or data. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, a UE may end up switching between CFRA and CBRA based on a selected beam for each random access resource selection because a network may be expected to allocate CFRA resources only to a subset of beams in a cell. In such embodiments, this may happen (e.g., during HO) if the UE is configured with CFRA resources, but at the time of random access resource selection none of the SSBs having a configured CFRA resource are above a selection threshold. Moreover, in such embodiments the UE may fall back to CBRA resources where it is possible to select any SSB. If the CBRA fails contention resolution (e.g., if the selected SSB does not provide sufficient quality), the UE may perform a new random access resource selection that may lead to a successful SSB selection and CFRA. As may be appreciated, the switch from CBRA to CFRA may only be applicable to UEs in an RRC connected mode. Table 1 shows a random access procedure for resource selection, such as one that may be used for NR.

TABLE 1

Random Access Resource Selection

The MAC entity shall:
   1> if the Random Access procedure was initiated for beam failure recovery (as specified in subclause 5.17); and
   1> if the beamFailureRecoveryTimer (in subclause 5.17) is either running or not configured; and
   1> if the contention-free Random Access Resources for beam failure recovery request associated with any of the
      SSBs and/or CSI-RSs have been explicitly provided by RRC; and
   1> if at least one of the SSBs with SS-RSRP above rsrp-ThresholdSSB amongst the SSBs in
      candidate BeamRSList or the CSI-RSs with CSI-RSRP above rsrp-ThresholdCSI-RS amongst the CSI-RSs in
      candidateBeamRSList is available:
      2> select an SSB with SS-RSRP above rsrp-ThresholdSSB amongst the SSBs in candidateBeamRSList or a
         CSI-RS with CSI-RSRP above rsrp-ThresholdCSI-RS amongst the CSI-RSs in candidateBeamRSList;
      2> if CSI-RS is selected, and there is no ra-PreambleIndex associated with the selected CSI-RS:
         3> set the PREAMBLE_INDEX to a ra-PreambleIndex corresponding to the SSB in candidateBeamRSList
            which is quasi-collocated with the selected CSI-RS as specified in TS 38.214 [7].
      2> else:
         3> set the PREAMBLE_INDEX to a ra-PreambleIndex corresponding to the selected SSB or CSI-RS from
            the set of Random Access Preambles for beam failure recovery request.
   1> else if the ra-PreambleIndex has been explicitly provided by either PDCCH or RRC; and
   1> if the ra-PreambleIndex is not 0b000000; and
   1> if contention-free Random Access Resource associated with SSBs or CSI-RSs have not been explicitly
      provided by RRC:
      2> set the PREAMBLE_INDEX to the signalled ra-PreambleIndex.

TABLE 1-continued

Random Access Resource Selection

1> else if the contention-free Random Access Resources associated with SSBs have been explicitly provided by RRC and at least one SSB with SS-RSRP above rsrp-ThresholdSSB amongst the associated SSBs is available:
  2> select an SSB with SS-RSRP above rsrp-ThresholdSSB amongst the associated SSBs;
  2> set the PREAMBLE_INDEX to a ra-PreambleIndex corresponding to the selected SSB.
1> else if the contention-free Random Access Resources associated with CSI-RSs have been explicitly provided by RRC and at least one CSI-RS with CSI-RSRP above rsrp-ThresholdCSI-RS amongst the associated CSI-RSs is available:
  2> select a CSI-RS with CSI-RSRP above rsrp-ThresholdCSI-RS amongst the associated CSI-RSs;
  2> set the PREAMBLE_INDEX to a ra-PreambleIndex corresponding to the selected CSI-RS.
1> else:
  2> if at least one of the SSBs with SS-RSRP above rsrp-ThresholdSSB is available:
    3> select an SSB with SS-RSRP above rsrp-ThresholdSSB.
  2> else:
    3> select any SSB.
  2> if Msg3 has not yet been transmitted:
    3> if Random Access Preambles group B is configured:
      4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower—msg3-DeltaPreamble—messagePowerOffsetGroupB; or
      4> if the Random Access procedure was initiated for the CCCH logical channel and the CCCH SDU size plus MAC subheader is greater than ra-Msg3SizeGroupA:
        5> select the Random Access Preambles group B.
      4> else:
        5> select the Random Access Preambles group A.
    3> else:
      4> select the Random Access Preambles group A.
  2> else (i.e. Msg3 is being retransmitted):
    3> select the same group of Random Access Preambles as was used for the Random Access Preamble transmission attempt corresponding to the first transmission of Msg3.
  2> if the association between Random Access Preambles and SSBs is configured:
    3> select a ra-PreambleIndex randomly with equal probability from the Random Access Preambles associated with the selected SSB and the selected Random Access Preambles group.
  2> else:
    3> select a ra-PreambleIndex randomly with equal probability from the Random Access Preambles within the selected Random Access Preambles group.
  2> set the PREAMBLE_INDEX to the selected ra-PreambleIndex.
1> if an SSB is selected above and an association between PRACH occasions and SSBs is configured:
  2> determine the next available PRACH occasion from the PRACH occasions corresponding to the selected SSB permitted by the restrictions given by the ra-ssb-OccasionMaskIndex if configured (the MAC entity shall select a PRACH occasion randomly with equal probability amongst the PRACH occasions occurring simultaneously but on different subcarriers, corresponding to the selected SSB; the MAC entity may take into account the possible occurrence of measurement gaps when determining the next available PRACH occasion corresponding to the selected SSB).
1> else if a CSI-RS is selected above and an association between PRACH occasions and CSI-RSs is configured:
  2> determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> else if Random Access procedure was initiated for beam failure recovery; and
1> if a CSI-RS is selected above and there is no contention-free Random Access Resource associated with the selected CSI-RS:
  2> determine the next available PRACH occasion from the PRACH occasions, permitted by the restrictions given by the ra-ssb-OccasionMaskIndex if configured, corresponding to the SSB in candidateBeamRSList which is quasi-collocated with the selected CSI-RS as specified in TS 38.214 [7] (the MAC entity may take into account the possible occurrence of measurement gaps when determining the next available PRACH occasion corresponding to the SSB which is quasi-collacted with the selected CSI-RS).
1> else:
  2> determine the next available PRACH occasion (the MAC entity shall select a PRACH occasion randomly with equal probability amongst the PRACH occasions occurring simultaneously but on different subcarriers; the MAC entity may take into account the possible occurrence of measurement gaps when determining the next available PRACH occasion).
1> perform the Random Access Preamble transmission procedure (see subclause 5.1.3).

In certain embodiments, if a UE applies CBRA and then switches to CFRA, a Message 3 (e.g., Msg3) may have been generated and stored in a Message 3 buffer (e.g., Msg3 buffer). In some embodiments, a UE may transmit a TB stored in the Msg3 buffer also for a CFRA (e.g., uplink transmission allocated by a random access response message). In such embodiments, a HARQ buffer may be flushed if contention resolution fails and a MAC PDU transmitted in the Message 3 may be stored in the Msg3 buffer. Moreover, in such embodiments, if the random access procedure continues and a new RAR is received, because there is a MAC PDU stored in the Msg3 buffer irrespective of whether it is a CBRA or a CFRA, the UE may transmit a TB from the Msg3 buffer on the UL resources allocated by RAR.

If a grant is received in the new RAR, the UE may deliver the uplink grant and the associated HARQ information to a HARQ entity as described in Table 2.

TABLE 2

2> if the uplink grant was received in a Random Access Response; or
2> if the uplink grant is part of a bundle of the configured uplink grant, and may be used for initial transmission according to subclause 6.1.2.3 of TS 38.214 [7], and if no MAC PDU has been obtained for this bundle:
    3> if there is a MAC PDU in the Msg3 buffer and the uplink grant was received in a Random Access Response:
        4> obtain the MAC PDU to transmit from the Msg3 buffer.
    3> else:
        4> obtain the MAC PDU to transmit from the Multiplexing and assembly entity, if any;
    3> if a MAC PDU to transmit has been obtained:
        4> deliver the MAC PDU and the uplink grant and the HARQ information of the TB to the identified HARQ process;
        4> instruct the identified HARQ process to trigger a new transmission;

Accordingly, the MAC PDU from the Msg3 buffer may be obtained for transmission.

In various embodiments, if a UE receives a RAR successfully in response to a contention-free RACH preamble transmission, the UE may process an UL grant in the RAR and obtain a MAC PDU from a Msg3 buffer for a CBRA-to-CFRA switching case. However, because the CFRA procedure is successfully completed upon reception of the RAR, the UE may flush the HARQ process used for the transmission of a TB from the Msg3 buffer.

In some embodiments, a UE may upon reception of a RAR obtain a TB stored in a Msg3 buffer and store it in a HARQ buffer of HARQ process 0 and then subsequently flush the HARQ buffer of HARQ process 0 (e.g., because a RACH procedure was completed). Table 3 shows one embodiment of a random access response reception. Table 4 shows one embodiment of completion of a random access procedure.

TABLE 3

Random Access Response Reception

Once the Random Access Preamble is transmitted and regardless of the possible occurrence of a measurement gap, the MAC entity shall:
    1> if the contention-free Random Access Preamble for beam failure recovery request was transmitted by the MAC entity
        2> start the ra-Response Window configured in BeamFailureRecoveryConfig at the first PDCCH occasion as specified in TS 38.213 [6] from the end of the Random Access Preamble transmission;
        2> monitor the PDCCH of the SpCell for response to beam failure recovery request identified by the C-RNTI while ra-Response Window is running.
        2> start the ra-Response Window configured in RACH-ConfigCommon at the first PDCCH occasion as specified in TS 38.213 [6] from the end of the Random Access Preamble transmission;
    1> else:
        2> monitor the PDCCH of the SpCell for Random Access Response(s) identified by the RA-RNTI while the ra-Response Window is running.
    1> if notification of a reception of a PDCCH transmission is received from lower layers; and
    1> if PDCCH transmission is addressed to the C-RNTI; and
    1> if the contention-free Random Access Preamble for beam failure recovery request was transmitted by the MAC entity:
        2> consider the Random Access procedure successfully completed.
    1> else if a downlink assignment has been received on the PDCCH for the RA-RNTI and the received TB is successfully decoded:
        2> if the Random Access Response contains a MAC subPDU with Backoff Indicator:
            3> set the PREAMBLE_BACKOFF to value of the BI field of the MAC subPDU using Table 7.2-1, multiplied with SCALING_FACTOR_BI.
        2> else:
            3> set the PREAMBLE_BACKOFF to 0 ms.
        2> if the Random Access Response contains a MAC subPDU with Random Access Preamble identifier corresponding to the transmitted PREAMBLE_INDEX (see subclause 5.1.3):
            3> consider this Random Access Response reception successful.
        2> if the Random Access Response reception is considered successful:
            3> if the Random Access Response includes a MAC subPDU with RAPID only:
                4> consider this Random Access procedure successfully completed;
                4> indicate the reception of an acknowledgement for SI request to upper layers.
            3> else:
                4> apply the following actions for the Serving Cell where the Random Access Preamble was transmitted:
                    5> process the received Timing Advance Command (see subclause 5.2);
                    5> indicate the preambleReceivedTargetPower and the amount of power ramping applied to the latest Random Access Preamble transmission to lower layers (i.e. (PREAMBLE_POWER_RAMPING_COUNTER-1)× PREAMBLE_POWER_RAMPING_STEP);
                    5> if the Serving Cell for the Random Access procedure is SRS-only SCell:
                        6> ignore the received UL grant.
                    5> else:
                        6> process the received UL grant value and indicate it to the lower layers.
                4> if the Random Access Preamble was not selected by the MAC entity among the contention-based Random Access Preamble(s):
                    5> consider the Random Access procedure successfully completed.

TABLE 3-continued

Random Access Response Reception

4> else:
    5> set the TEMPORARY_C-RNTI to the value received in the Random Access Response;
    5> if this is the first successfully received Random Access Response within this Random Access procedure:
        6> if the transmission is not being made for the CCCH logical channel:
            7> indicate to the Multiplexing and assembly entity to include a C-RNTI MAC CE in the subsequent uplink transmission.
        6> obtain the MAC PDU to transmit from the Multiplexing and assembly entity and store it in the Msg3 buffer.

TABLE 4

Completion of a Random Access Procedure

Upon completion of the Random Access procedure, the MAC entity shall:
    1> discard explicitly signalled contention-free Random Access Resources except contention-free Random Access Resources for beam failure recovery request, if any;
    1> flush the HARQ buffer used for transmission of the MAC PDU in the Msg3 buffer.

In certain embodiments described herein, a UE may switch between CBRA and CFRA and, in such embodiments, a Msg3 buffer may not be empty at a time in which the UE performs CFRA.

In various embodiments, for switching between CBRA and CFRA, if a grant provided in response to a CFRA preamble transmission is equal in size to a grant provided earlier in a response to a CBRA preamble transmission, a MAC PDU in a Msg3 buffer may be transmitted in the provided grant. However, in such embodiments, two different preamble groups may be defined and a network may not know if the UE has attempted CBRA before CFRA. Accordingly, it may not be possible for the network to know which size of grant should be provided to the UE to avoid different grant sizes from the MAC PDU being in the Msg3 buffer.

As may be appreciated, various embodiments described herein may be used for: rebuilding a MAC PDU if a UL grant received within RAR doesn't match a size of a TB in a Msg3 buffer; and/or avoiding flushing of a HARQ buffer used for transmission of the MAC PDU generated according to the UL grant received within RAR.

In some embodiments, a UE implementation may be used to determine what happens if a RAR grant size does not match a size of a TB stored in a Msg3 buffer is not specified. In certain embodiments, a UE may generate a new transport block according to a latest received RAR UL grant. In other words, data contained in a TB in a Msg3 buffer may be lost (e.g., for RLC-UM/TM) or a network and/or UE may rely on an RLC retransmission for RLC-AM.

In various embodiments, a UE may set an RLC context and/or status LCHs for which data is contained in a TB in a Msg3 buffer to a time instance before LCP is performed for the TB in the Msg3 buffer (e.g., undo an LCP procedure for the TB stored in the Msg3 buffer). As described herein, a loss of data may be avoided if an RAR grant size does not match a size of a TB Stored in a Msg3 buffer.

Figure 4:
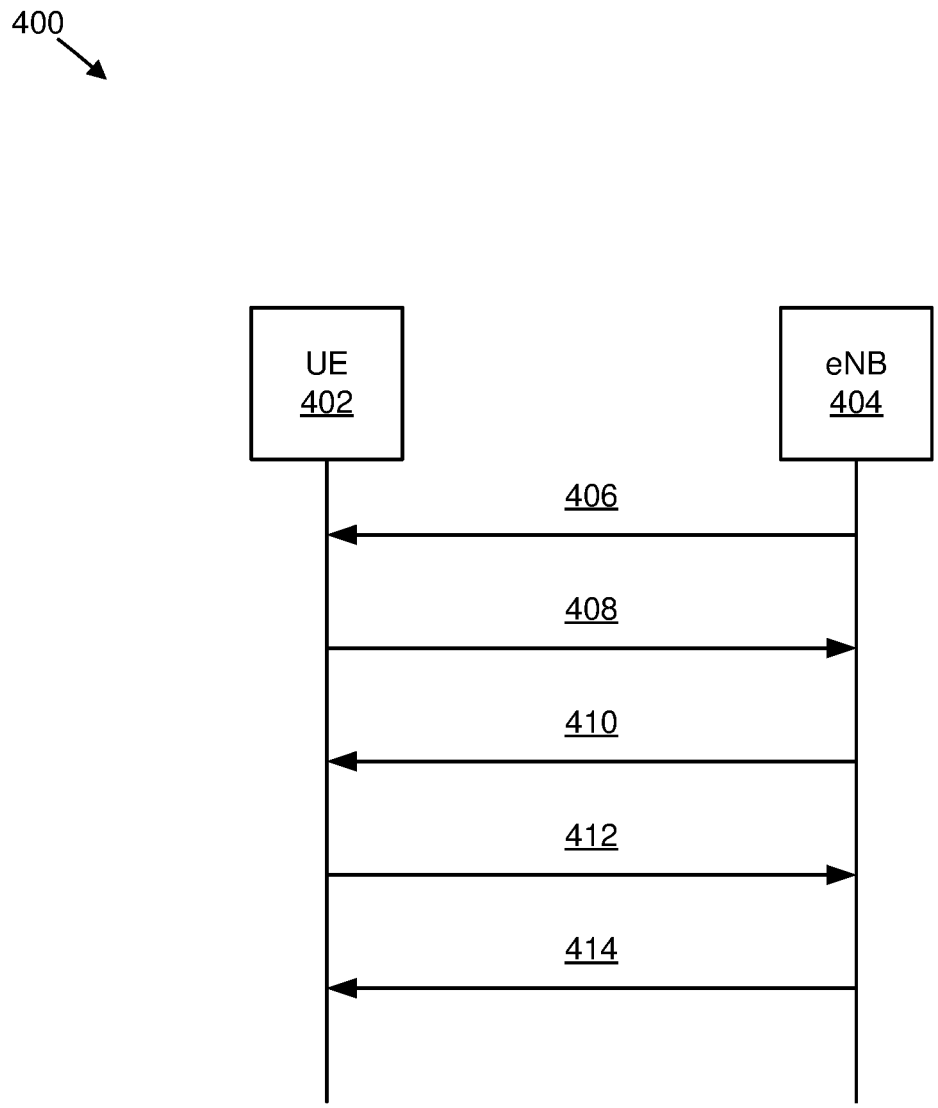
FIG. 4 is a communication diagram illustrating one embodiment of communications as part of a RACH procedure.

FIG. 4 is a communication diagram illustrating one embodiment of communications 400 as part of a RACH procedure. The communications 400 occur between a UE 402 (e.g., remote unit 102) and an eNB 404 (e.g., network unit 104, gNB). As may be appreciated, each of the communications 400 described herein may include one or more messages.

In one embodiment, in a first communication 406 transmitted from the eNB 404 to the UE 402, the eNB 404 transmits a SIB to the UE 402. In certain embodiments, in a second communication 408 transmitted from the UE 402 to the eNB 404, the UE 402 transmits a PRACH preamble to the eNB 404. In some embodiments, in a third communication 410 transmitted from the eNB 404 to the UE 402, the eNB 404 transmits a RAR to the UE 402.

In various embodiments, in a fourth communication 412 transmitted from the UE 402 to the eNB 404, the UE 402 transmits an uplink transmission on the PUSCH, e.g. connect request message to the eNB 404. In one embodiment, in a fifth communication 414 transmitted from the eNB 404 to the UE 402, the eNB 404 transmits a contention resolution message to the UE 402.

As may be appreciated, FIG. 4 shows CBRA. It should be noted that CFRA does not include the fourth communication 412 and the fifth communication 414. In some embodiments, in CFRA a UE may be allocated a RACH preamble and/or RACH resource (e.g., by means of a PDCCH order) that makes a need for a contention resolution obsolete. An RAR message may have the same content for CBRA and CFRA. As may be appreciated, a CFRA may be used for handover (HO), uplink timing alignment, and beam failure recovery, for example.

In a first embodiment, a UE may flush only a HARQ buffer used for transmission of a MAC PDU in a Msg3 buffer if a PRACH preamble is selected from a set of contention-based random access preambles. In other words, if a RACH attempt successfully completed (e.g., a random access procedure successfully completed) is a contention-based RACH, the UE may flush a HARQ buffer used for transmission of a MAC PDU of a Msg3 buffer (e.g., the HARQ buffer of HARQ process 0). If a contention-free RACH attempt is successfully completed, a UE may not flush a HARQ buffer.

Table 5 shows one embodiment of an implementation of completion of a random access procedure based on the first embodiment.

TABLE 5

Completion of a Random Access Procedure

Upon completion of the Random Access procedure, the MAC entity shall:
   1> discard explicitly signalled contention-free Random Access Resources except contention-free Random Access
      Resources for beam failure recovery request, if any;
   1> if the Random Access Preamble was selected by the MAC entity among the contention-based Random Access
      Preamble(s):
         2>flush the HARQ buffer used for transmission of the MAC PDU in the Msg3 buffer.

In certain embodiments, a new condition may ensure that a HARQ buffer of a HARQ process 0 is not flushed if CFRA is performed by a UE. Therefore, if the UE switches between a CBRA and CFRA, the HARQ buffer used for transmission of Msg3 TB is not flushed. Hence the MAC PDU that is obtained from a Msg3 buffer may be transmitted (or retransmitted) on UL resources granted by an UL grant in a RAR and/or on uplink resources allocated by a retransmission grant.

In a second embodiment, a UE may first flush a HARQ buffer used for transmission of a MAC PDU in a Msg3 buffer before processing a received UL grant within a RAR and obtaining the MAC PDU from the Msg3 buffer (e.g., if a MAC PDU is stored in a Msg3 buffer). Therefore, HARQ buffer flushing may be executed before an UL grant received within a RAR is processed.

In a third embodiment, if an UL grant is received within a RAR message that does not fit a size of a TB stored in the Msg3 buffer, a UE performs an LCP procedure according to the UL grant received within the RAR. Accordingly, MAC subPDUs from a MAC PDU stored in a Msg3 buffer may be used as an input to the LCP procedure.

In certain embodiments, MAC subPDUs (e.g. MAC subPDUs carrying MAC CEs or MAC subPDUs carrying MAC SDUs) from a MAC PDU in a Msg3 buffer may be prioritized over any other data pending in a UE for transmission. In such embodiments, the UE may reserve space for the MAC subPDUs from the MAC PDU in the Msg3 buffer in the TB scheduled by the RAR (e.g., as indicated by an UL grant within a RAR) and may add MAC subPDUs according to an LCP procedure. As may be appreciated, including the MAC subPDUs from the MAC PDU in Msg3 buffer may not affect a token bucket status of corresponding logical channels. If the TB size indicated by the UL grant within the RAR is larger than the TB stored in Msg3 buffer, the UE takes all the MAC subPDUs from the TB stored in the Msg3 buffer (e.g., except possibly padding MAC subPDU) and fills the remaining available space with new MAC subPDUs according to the LCP procedure.

In some embodiments, if a TB size indicated by an UL grant within a RAR is smaller than the TB size of a MAC PDU stored in a Msg3 buffer, a UE may take MAC subPDUs from an obtained MAC PDU (e.g., the TB from the Msg3 buffer) in a descending priority order starting with a highest priority MAC subPDU until the UL grant is exhausted. The remaining space may be filled with MAC subPDUs (e.g., new MAC subPDUs) according to an LCP procedure. In one embodiment, a priority of the MAC subPDUs may be defined according a relative priority order specified in section 5.4.3.1.3 of TS38.321 as well as a logical channel priority configured by RRC signaling. In such embodiments, the MAC subPDUs (e.g. MAC subPDUs carrying MAC CEs or MAC subPDUs carrying MAC SDUs) from the MAC PDU in the Msg3 buffer may be prioritized over any other data pending in the UE for transmission (e.g., the UE reserves space for the MAC subPDUs from the MAC PDU in the Msg3 buffer from the TB size—such as by being indicated by the UL grant within RAR).

In certain embodiments, because an LCP procedure may be done for an entire UL grant, LCP may be performed for a TB size indicated by the UL grant and a generated MAC PDU may be compliant to a defined MAC PDU format (e.g., MAC subPDUs taken from the TB stored in the Msg3 buffer and newly generated MAC subPDUs may be placed at a correct position within a MAC PDU).

Table 6 shows one embodiment of implementing the third embodiment. In Table 6, a UE may indicate to a multiplexing and assembly entity to include MAC subPDUs from an obtained MAC PDU in a subsequent uplink transmission thereby prioritizing MAC subPDUs from the obtained MAC PDU over newly generated MAC subPDUs if an uplink grant size (e.g., received within a RAR) does not match the size of the MAC PDU from a Msg3 buffer.

TABLE 6

HARQ Entity

2> if the uplink grant was received in a Random Access Response; or
    2> if the uplink grant is part of a bundle of the configured uplink grant, and may be used for initial
       transmission according to subclause 6.1.2.3 of TS 38.214 [7], and if no MAC PDU has been obtained for
       this bundle:
         3> if there is a MAC PDU in the Msg3 buffer and the uplink grant was received in a Random Access
           Response:
           4> obtain the MAC PDU to transmit from the Msg3 buffer.
           4> if the uplink grant size does not match with the size of the obtained MAC PDU:
              5> indicate to the Multiplexing and assembly entity to include MAC subPDUs from the obtained
                 MAC PDU in the subsequent uplink transmission thereby prioritizing MAC subPDUs from the
                 obtained MAC PDU over newly generated MAC subPDUs;
              5> obtain the MAC PDU to transmit from the Multiplexing and assembly entity.
         3> else:
           4> obtain the MAC PDU to transmit from the Multiplexing and assembly entity, if any;

TABLE 6-continued

HARQ Entity

3> if a MAC PDU to transmit has been obtained:
    4> deliver the MAC PDU and the uplink grant and the HARQ information of the TB to the identified
       HARQ process;
    4> instruct the identified HARQ process to trigger a new transmission;

In various embodiments, a UE prioritizes MAC subPDUs from a MAC PDU in a Msg3 buffer containing a MAC SDU of an SRB over any other data (e.g., data pending in the UE for transmission as well as other MAC subPDUs from the MAC PDU in the Msg3 buffer). In such embodiments, an RRC message may be placed first in a new MAC PDU (e.g., generated according to an UL grant within a RAR) before a MAC CE. As may be appreciated, a benefit of such a prioritization may be that a handover complete message may be carried in a newly generated MAC PDU even if a TB size indicated by the UL grant within the RAR is smaller than the TB size of the MAC PDU stored in the Msg3 buffer.

In a fourth embodiment, if a UE receives an UL grant within a RAR message that does not fit a size of a TB stored in a Msg3 buffer, the UE may perform an LCP procedure according to the UL grant received within the RAR, thereby using MAC subPDUs from a MAC PDU stored in the Msg3 buffer as an input to the LCP procedure except MAC subPDUs containing a MAC CE or padding (using MAC subPDUs containing a MAC SDU as an input to the LCP procedure). In such an embodiment, the UE may instruct a multiplexing and assembly procedure to newly generate MAC CEs contained in the TB stored in the Msg3 buffer. For example, if a BSR MAC CE is contained within the MAC PDU in the Msg3 buffer, then the UE may generate a new BSR MAC CE (e.g., reflecting the most recent buffer status) and include it in the MAC PDU (e.g., if there is sufficient space according to an LCP procedure). Therefore, the BSR MAC CE type may be different (e.g., truncated BSR MAC CE may be contained in the TB from the Msg3 buffer) as long as the BSR MAC CE is included in the new MAC PDU according to the UL grant received within the RAR.

In some embodiments, a UE considers MAC subPDUs containing a MAC CE as input for an LCP procedure. However, the UE may update the content of the MAC CEs according to a most recent UE status (e.g., a buffer status for a BSR MAC CE or a power situation for a PHR MAC CE).

Figure 5:
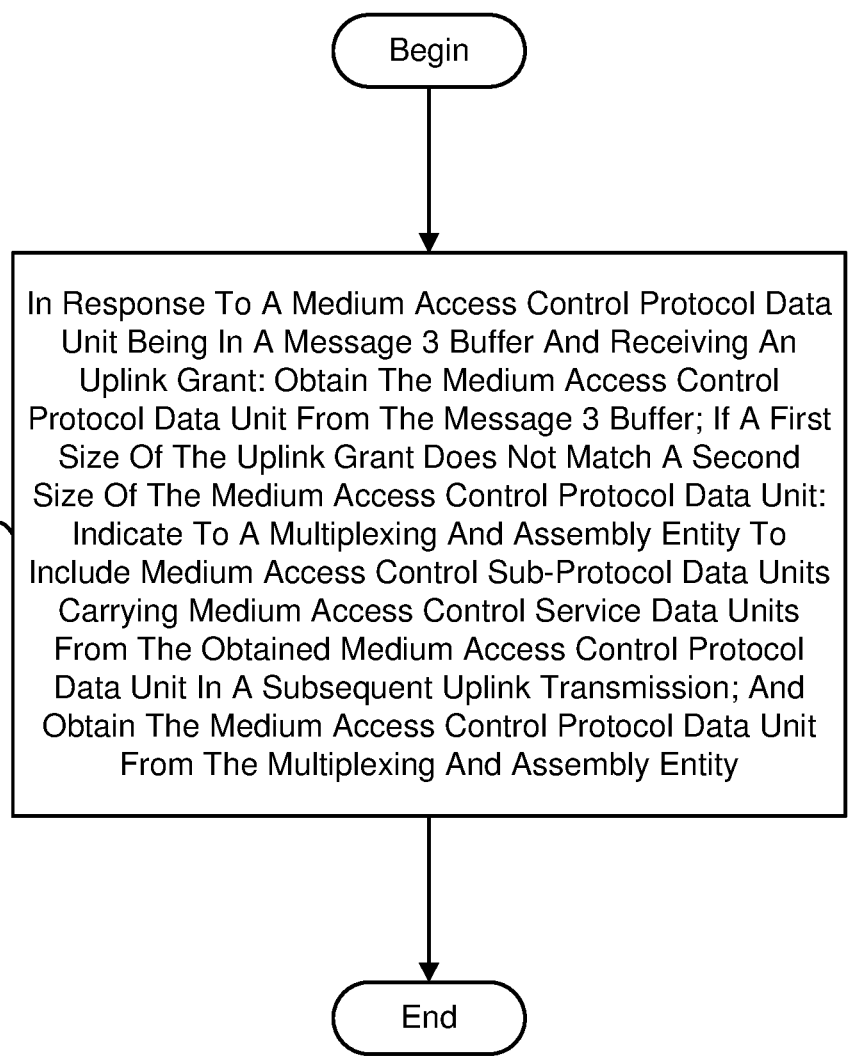
FIG. 5 is a flow chart diagram illustrating one embodiment of a method for using a medium access control protocol data unit in a message 3 buffer.

FIG. 5 is a flow chart diagram illustrating one embodiment of a method 500 for using a medium access control protocol data unit in a message 3 buffer. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include, in response to a medium access control protocol data unit being in a message 3 buffer and receiving an uplink grant: obtaining 502 the medium access control protocol data unit from the message 3 buffer; if a first size of the uplink grant does not match a second size of the medium access control protocol data unit: indicating to a multiplexing and assembly entity to include medium access control sub-protocol data units carrying medium access control service data units from the obtained medium access control protocol data unit in a subsequent uplink transmission; and obtaining the medium access control protocol data unit from the multiplexing and assembly entity.

In certain embodiments, receiving the uplink grant comprises receiving the uplink grant within a random access response as part of a non-contention based random access procedure. In some embodiments, the method 500 further comprises performing a logical channel prioritization procedure based on the uplink grant. In various embodiments, the medium access control sub-protocol data units are used as inputs to the logical channel prioritization procedure.

In one embodiment, the medium access control sub-protocol data units comprising a medium access control control element are excluded from being part of the inputs. In certain embodiments, the medium access control sub-protocol data units comprising padding are excluded from being part of the inputs. In some embodiments, the method 500 further comprises instructing the multiplexing and assembly entity to generate medium access control control elements contained in the medium access control protocol data unit.

In various embodiments, the method 500 further comprises flushing a hybrid automatic repeat request buffer used for transmission of the medium access control protocol data unit in the message 3 buffer if a random access channel preamble from a set of contention-based random access preambles is used. In one embodiment, the method 500 further comprises flushing a hybrid automatic repeat request buffer used for transmission of the medium access control protocol data unit in the message 3 buffer before processing the uplink grant.

In one embodiment, a method comprises: in response to a medium access control protocol data unit being in a message 3 buffer and receiving an uplink grant: obtaining the medium access control protocol data unit from the message 3 buffer; if a first size of the uplink grant does not match a second size of the medium access control protocol data unit: indicating to a multiplexing and assembly entity to include medium access control sub-protocol data units carrying medium access control service data units from the obtained medium access control protocol data unit in a subsequent uplink transmission; and obtaining the medium access control protocol data unit from the multiplexing and assembly entity.

In certain embodiments, receiving the uplink grant comprises receiving the uplink grant within a random access response as part of a non-contention based random access procedure.

In some embodiments, the method further comprises performing a logical channel prioritization procedure based on the uplink grant.

In various embodiments, the medium access control sub-protocol data units are used as inputs to the logical channel prioritization procedure.

In one embodiment, the medium access control sub-protocol data units comprising a medium access control control element are excluded from being part of the inputs.

In certain embodiments, the medium access control sub-protocol data units comprising padding are excluded from being part of the inputs.

In some embodiments, the method further comprises instructing the multiplexing and assembly entity to generate medium access control control elements contained in the medium access control protocol data unit.

In various embodiments, the method further comprises flushing a hybrid automatic repeat request buffer used for transmission of the medium access control protocol data unit in the message 3 buffer if a random access channel preamble from a set of contention-based random access preambles is used.

In one embodiment, the method further comprises flushing a hybrid automatic repeat request buffer used for transmission of the medium access control protocol data unit in the message 3 buffer before processing the uplink grant.

In one embodiment, an apparatus comprises: a receiver; and a processor that: in response to a medium access control protocol data unit being in a message 3 buffer and the receiver receiving an uplink grant: obtains the medium access control protocol data unit from the message 3 buffer; if a first size of the uplink grant does not match a second size of the medium access control protocol data unit: indicates to a multiplexing and assembly entity to include medium access control sub-protocol data units carrying medium access control service data units from the obtained medium access control protocol data unit in a subsequent uplink transmission; and obtains the medium access control protocol data unit from the multiplexing and assembly entity.

In certain embodiments, the receiver receiving the uplink grant comprises the receiver receiving the uplink grant within a random access response as part of a non-contention based random access procedure.

In some embodiments, the processor performs a logical channel prioritization procedure based on the uplink grant.

In various embodiments, the medium access control sub-protocol data units are used as inputs to the logical channel prioritization procedure.

In one embodiment, the medium access control sub-protocol data units comprising a medium access control control element are excluded from being part of the inputs.

In certain embodiments, the medium access control sub-protocol data units comprising padding are excluded from being part of the inputs.

In some embodiments, the processor instructs the multiplexing and assembly entity to generate medium access control control elements contained in the medium access control protocol data unit.

In various embodiments, the processor flushes a hybrid automatic repeat request buffer used for transmission of the medium access control protocol data unit in the message 3 buffer if a random access channel preamble from a set of contention-based random access preambles is used.

In one embodiment, the processor flushes a hybrid automatic repeat request buffer used for transmission of the medium access control protocol data unit in the message 3 buffer before processing the uplink grant.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive a random access response message including an uplink grant;
obtain a medium access control (MAC) protocol data unit (PDU) from a message 3 (Msg3) buffer based at least in part on that the uplink grant is received in the random access response message;
determine that an uplink grant size is different than a size of the obtained MAC PDU; and
output an indication to include only one or more MAC sub-protocol data units (subPDUs) carrying only one or more MAC service data units (MAC SDUs) from the obtained MAC PDU in a subsequent uplink transmission based at least in part on the determination that the uplink grant size is different than the size of the obtained MAC PDU.

2. The UE of claim 1, wherein the at least one processor is configured to cause the UE to:
receive the random access response message during a random access procedure.

3. The UE of claim 2, wherein the at least one processor is configured to cause the UE to:
determine that the MAC PDU is stored in the Msg3 buffer, wherein the MAC PDU from the Msg3 buffer is obtained based at least in part on that the MAC PDU is stored in the Msg3 buffer and the uplink grant is received in the random access response message during the random access procedure.

4. The UE of claim 3, wherein the at least one processor is configured to cause the UE to:
determine a completion of the random access procedure, wherein the indication to include the one or more MAC subPDUs carrying the one or more MAC SDUs from the obtained MAC PDU is outputted based at least in part on the determination of the completion of the random access procedure and the determination that the uplink grant size is different than the size of the obtained MAC PDU.

5. The UE of claim 1, wherein, to output the indication, the at least one processor is configured to cause the UE to:
output, to a multiplexing and assembly entity of the UE, the indication to include the one or more MAC subPDUs carrying the one or more MAC SDUs from the obtained MAC PDU.

6. The UE of claim 5, wherein the at least one processor is configured to cause the UE to:
obtain, from the multiplexing and assembly entity of the UE, the MAC PDU; and
transmit the obtained MAC PDU from the multiplexing and assembly entity of the UE.

7. The UE of claim 5, wherein one or more one or more MAC subPDUs carrying one or more MAC control elements (MAC-CEs) are excluded in the obtained MAC PDU from the multiplexing and assembly entity of the UE.

8. A method performed at a user equipment (UE), the method comprising:
receiving a random access response message including an uplink grant;
obtaining a medium access control (MAC) protocol data unit (PDU) from a message 3 (Msg3) buffer based at least in part on that the uplink grant is received in the random access response message;

determining that an uplink grant size is different than a size of the obtained MAC PDU; and outputting an indication to include only one or more MAC sub-protocol data units (subPDUs) carrying only one or more MAC service data units (MAC SDUs) from the obtained MAC PDU in a subsequent uplink transmission based at least in part on the determination that the uplink grant size is different than the size of the obtained MAC PDU.

9. The method of claim 8, further comprising:
receiving the random access response message during a random access procedure.

10. The method of claim 9, further comprising:
determining that the MAC PDU is stored in the Msg3 buffer,
wherein the MAC PDU from the Msg3 buffer is obtained based at least in part on that the MAC PDU is stored in the Msg3 buffer and the uplink grant is received in the random access response message during the random access procedure.

11. The method of claim 10, further comprising:
determining a completion of the random access procedure,
wherein the indication to include the one or more MAC subPDUs carrying the one or more MAC SDUs from the obtained MAC PDU is outputted based at least in part on the determining the completion of the random access procedure and the determining that the uplink grant size is different than the size of the obtained MAC PDU.

12. The method of claim 8, wherein outputting the indication comprises:
outputting, to a multiplexing and assembly entity of the UE, the indication to include the one or more MAC subPDUs carrying the one or more MAC SDUs from the obtained MAC PDU.

13. The method of claim 12, further comprising:
obtaining, from the multiplexing and assembly entity of the UE, the MAC PDU; and
transmitting the obtained MAC PDU from the multiplexing and assembly entity of the UE.

14. The method of claim 12, wherein one or more one or more MAC subPDUs carrying one or more MAC control elements (MAC-CEs) are excluded in the obtained MAC PDU from the multiplexing and assembly entity of the UE.

15. A processor for wireless communication, comprising:
at least one controller coupled with at least one memory and configured to cause the processor to:
receive a random access response message including an uplink grant;
obtain a medium access control (MAC) protocol data unit (PDU) from a message 3 (Msg3) buffer based at least in part on that the uplink grant is received in the random access response message;
determine that an uplink grant size is different than a size of the obtained MAC PDU; and
output an indication to include only one or more MAC sub-protocol data units (subPDUs) carrying only one or more MAC service data units (MAC SDUs) from the obtained MAC PDU in a subsequent uplink transmission based at least in part on the determination that the uplink grant size is different than the size of the obtained MAC PDU.

16. The processor of claim 15, wherein the at least one controller is configured to cause the processor to:
determine that the MAC PDU is stored in the Msg3 buffer,
wherein the MAC PDU from the Msg3 buffer is obtained based at least in part on that the MAC PDU is stored in the Msg3 buffer and the uplink grant is received in the random access response message during a random access procedure.

17. The processor of claim 15, wherein the at least one controller is configured to cause the processor to:
receive the random access response message during a random access procedure.

18. The processor of claim 16, wherein the at least one controller is configured to cause the processor to:
determine a completion of the random access procedure,
wherein the indication to include the one or more MAC subPDUs carrying the one or more MAC SDUs from the obtained MAC PDU is outputted based at least in part on the determination of the completion of the random access procedure and the determination that the uplink grant size is different than the size of the obtained MAC PDU.

19. The processor of claim 15, wherein, to output the indication, the at least one controller is configured to cause the processor to:
output, to a multiplexing and assembly entity of the processor, the indication to include the one or more MAC subPDUs carrying the one or more MAC SDUs from the obtained MAC PDU.

20. The processor of claim 19, wherein the at least one controller is configured to cause the processor to:
obtain, from the multiplexing and assembly entity of the processor, the MAC PDU; and
transmit the obtained MAC PDU from the multiplexing and assembly entity of the processor.

* * * * *